(12) United States Patent
Ahsan et al.

(10) Patent No.: US 11,989,343 B2
(45) Date of Patent: May 21, 2024

(54) POSE VALIDITY FOR XR BASED SERVICES

(71) Applicant: Nokia Technologies Oy, Espoo (FI)

(72) Inventors: Saba Ahsan, Espoo (FI); Sujeet Shyamsundar Mate, Tampere (FI); Yu You, Kangasala (FI); Peter Oluwanisola Fasogbon, Tampere (FI); Igor Danilo Diego Curcio, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 18/093,018

(22) Filed: Jan. 4, 2023

(65) Prior Publication Data

US 2023/0214009 A1 Jul. 6, 2023

Related U.S. Application Data

(60) Provisional application No. 63/296,641, filed on Jan. 5, 2022.

(51) Int. Cl.
*G06F 3/01* (2006.01)
*G06F 3/0346* (2013.01)

(52) U.S. Cl.
CPC .............. *G06F 3/012* (2013.01); *G06F 3/011* (2013.01); *G06F 3/0346* (2013.01)

(58) Field of Classification Search
CPC ......... G06F 3/012; G06F 3/011; G06F 3/0346
See application file for complete search history.

(56) References Cited

U.S. PATENT DOCUMENTS

| | | | |
|---|---|---|---|
| 6,959,109 B2* | 10/2005 | Moustafa | G06V 10/242 382/117 |
| 7,391,888 B2* | 6/2008 | Hu | G06T 7/73 348/169 |
| 10,746,815 B2* | 8/2020 | Miller | G06F 3/038 |
| 10,768,693 B2* | 9/2020 | Powderly | G06F 3/017 |
| 10,812,936 B2* | 10/2020 | Reinhardt | G06F 3/011 |
| 10,861,242 B2* | 12/2020 | Lacey | G06F 3/011 |
| 11,145,083 B2* | 10/2021 | Schonberger | G06F 18/22 |
| 2003/0235332 A1* | 12/2003 | Moustafa | G06F 18/2137 382/157 |

(Continued)

OTHER PUBLICATIONS

"Augmented Reality Gaming" published Jun. 2, 2020 https://m.facebook.com/watch/?v=744995792912247&_rdr.

(Continued)

*Primary Examiner* — Michael J Jansen, II
(74) *Attorney, Agent, or Firm* — Joseph C. Drish; Harrington & Smith

(57) ABSTRACT

An apparatus comprising: at least one processor; and at least one non-transitory memory storing instructions that, when executed by the at least one processor, cause the apparatus at least to: transmit a pose and interactivity stream to a server, the pose and interactivity stream comprising data based on information obtained from at least one sensor; determine a validity of the pose and interactivity stream, the validity comprising at least one criterion for which the data within the pose and interactivity stream is considered valid; signal at least one parameter that defines the validity of the pose and interactivity stream; and signal a current state of the validity of the pose and interactivity stream.

20 Claims, 12 Drawing Sheets

(56) References Cited

U.S. PATENT DOCUMENTS

| | | | | |
|---|---|---|---|---|
| 2004/0240708 | A1* | 12/2004 | Hu | G06T 7/73 |
| | | | | 382/103 |
| 2018/0180682 | A1* | 6/2018 | Miller | G01R 33/0029 |
| 2018/0213359 | A1* | 7/2018 | Reinhardt | H04W 4/026 |
| 2018/0307303 | A1* | 10/2018 | Powderly | G06F 3/013 |
| 2019/0188533 | A1* | 6/2019 | Katabi | G06V 10/82 |
| 2019/0362557 | A1* | 11/2019 | Lacey | G06T 5/20 |
| 2020/0372672 | A1* | 11/2020 | Schonberger | G06T 7/74 |
| 2022/0044436 | A1* | 2/2022 | Yang | G01S 19/47 |
| 2022/0230350 | A1* | 7/2022 | Hur | G06F 16/532 |
| 2023/0214009 | A1* | 7/2023 | Ahsan | G06F 3/0346 |
| | | | | 345/156 |

OTHER PUBLICATIONS

"Pose Manager—Wave VR 5.2.0 Documentation" retrieved Apr. 3, 2023 https://hub.vive.com/storage/docs/en-us/UnrealPlugin/Unreal_PoseManager.html.

$3^{rd}$ Generation Partnership Project; Technical Specification Group SA; Support of 5G Glass-type Augmented Reality/Mixed Reality (AR/MR) Devices (Release 17) 3GPP TR 26.998 V1.0 (Oct. 2021). https://www.3gpp.org/ftp/TSG_SA/WG4_CODEC/3GPP_SA4_AHOC_MTGs/SA4_VIDEO/Docs/S4aV210813.zip.

$3^{rd}$ Generation Partnership Project; Technical Specification Group SA; Support of 5G Glass-Type Augmented Reality/Mixed Reality (AR/MR) Devices (Release 17) 3GPP TR 26.998 V1.40 (Nov. 2021). https://www.3gpp.org/ftp/tsg_sa/WG4_CODEC/TSGS4_116-e/Docs/S4-211545.zip.

\* cited by examiner

500

```
aligned(8) class ExtCameraInfo () {
  unsigned int(8)[4]  cam_pos_x; 502
  unsigned int(8)[4]  cam_pos_y; 504
  unsigned int(8)[4]  cam_pos_z; 506
  signed   int(32)    cam_quat_x; 508
  signed   int(32)    cam_quat_y; 510
  signed   int(32)    cam_quat_z; 512
}
```

RTP pose payload

First packet 660

- Validity criteria 662
- Pose information 664
- Pose validity status 666

Second packet 670

- Reference to previous criteria 672
- Pose information 674
- Pose validity status 676

| | |
|---|---|
| 702 | m=video 30000 RTP/AVP 98 |
| 704 | a=rtpmap:98 H265/90000 |
| 706 | a=mid:1 |
| 708 | vi=ifvalid:2 |
| 710 | m=video 30002 RTP/AVP 31 |
| 712 | a=rtpmap:31 H263/90000 |
| 714 | a=mid:2 |

| | |
|---|---|
| 752 | validityrange: 666 playarea <x,y,z> |
| 754 | validityrange: 667 playarea <x> |
| 756 | m=video 30000 RTP/AVP 98 |
| 758 | a=rtpmap:98 H265/90000 |
| 760 | a=mid:1 |
| 762 | vi=667:2 |
| 764 | m=video 30002 RTP/AVP 31 |
| 766 | a=rtpmap:31 H263/90000 |
| 768 | a=mid:2 |
| 770 | vi=666:2 |

FIG. 7B

POSE VALIDITY FOR XR BASED SERVICES

RELATED APPLICATION

This application claims priority to U.S. Provisional Application No. 63/296,641, filed Jan. 5, 2022, which is hereby incorporated by reference in its entirety.

TECHNICAL FIELD

The examples and non-limiting embodiments relate generally to multimedia and, more particularly, to pose validity for XR based services.

BACKGROUND

It is known to implement augmented reality, virtual reality, and mixed reality.

SUMMARY

In accordance with an aspect, an apparatus includes: at least one processor; and at least one non-transitory memory storing instructions that, when executed by the at least one processor, cause the apparatus at least to: transmit a pose and interactivity stream to a server, the pose and interactivity stream comprising data based on information obtained from at least one sensor; determine a validity of the pose and interactivity stream, the validity comprising at least one criterion for which the data within the pose and interactivity stream is considered valid; signal at least one parameter that defines the validity of the pose and interactivity stream; and signal a current state of the validity of the pose and interactivity stream.

In accordance with an aspect, an apparatus includes: at least one processor; and at least one non-transitory memory storing instructions that, when executed by the at least one processor, cause the apparatus at least to: receive a pose and interactivity stream from a client device, the pose and interactivity stream comprising data based on information obtained from at least one sensor; wherein a validity of the pose and interactivity stream comprises at least one criterion for which the data within the pose and interactivity stream is considered valid; receive signaling of at least one parameter that defines the validity of the pose and interactivity stream; and receive signaling of a current state of the validity of the pose and interactivity stream.

In accordance with an aspect, an apparatus includes: at least one processor; and at least one non-transitory memory storing instructions that, when executed by the at least one processor, cause the apparatus at least to: receive first pose information related to a client device, the first pose information comprising data based on information obtained from at least one sensor associated with the client device; receive a confidence value indicating a confidence of the first pose information, the confidence value being based on validity criteria for which the first pose information is valid; and adjust second pose information related to the apparatus, in response to the confidence value falling below a threshold; wherein the second pose information comprises data based on information obtained from at least one sensor associated with the apparatus.

BRIEF DESCRIPTION OF THE DRAWINGS

The foregoing aspects and other features are explained in the following description, taken in connection with the accompanying drawings.

FIG. 5 shows a single (V3C) pose representation in the ExtCameraInfo syntax element.

FIG. 6B depicts an example RTP pose payload.

FIG. 7A shows a SDP example for defining a validity indicator of one RTP stream based on another.

FIG. 7B shows a SDP example with two validity range identifiers defined at a session level.

DETAILED DESCRIPTION OF EXAMPLE EMBODIMENTS

Figure 1:
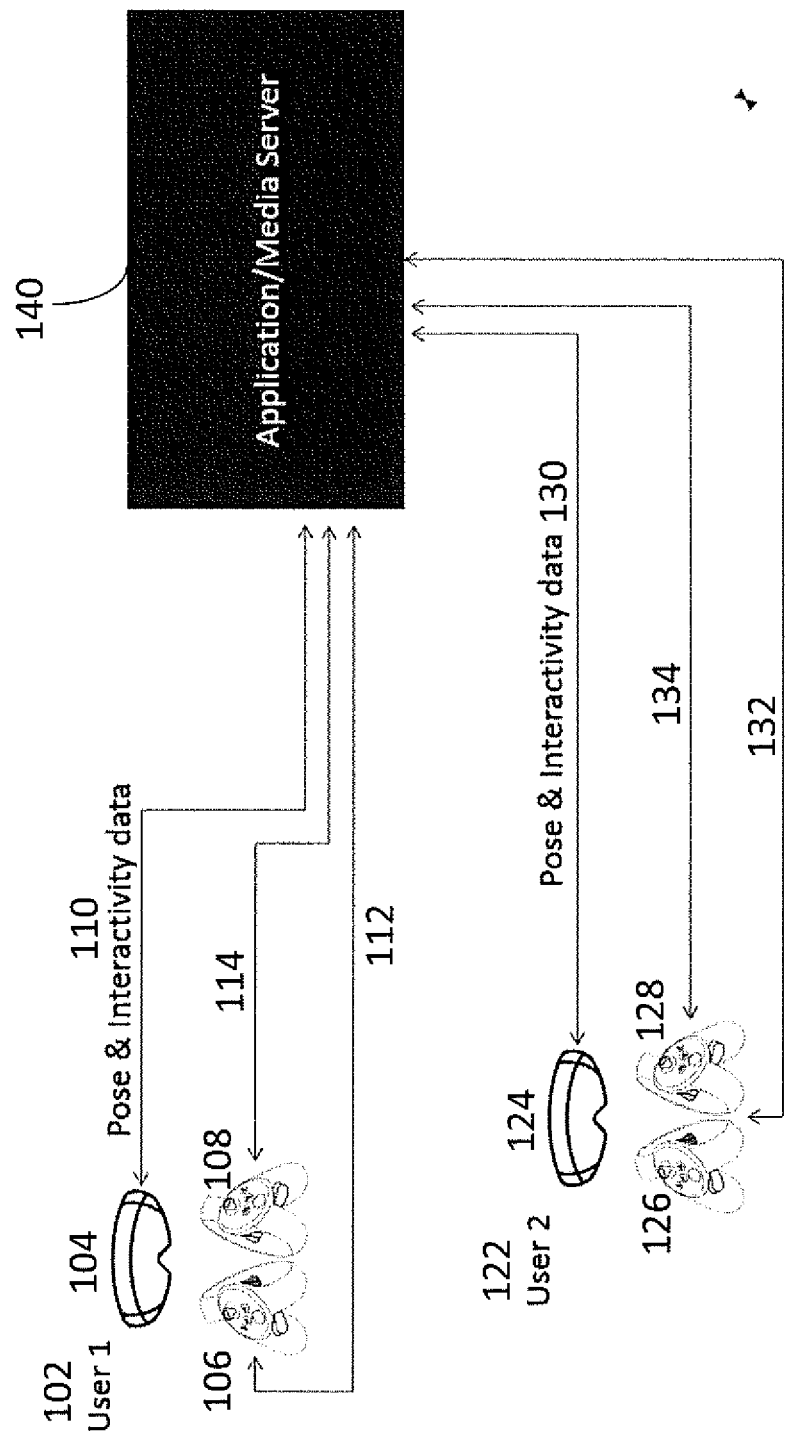
FIG. 1 shows a sample setup involving two users in possession of three devices each.

Augmented Reality (AR) and Mixed Reality (MR) applications may use cloud-based and edge AR functions that include but are not limited to remote or split rendering, spatial computing and localization. In order to realize such real-time AR/VR/MR use cases, pose data for spatial transformation (for instance, rotation and translation) and interactivity data needs to be streamed in real-time from the AR device over the network to the cloud or edge based AR function servers or a peer AR device (in case of peer to peer AR experiences). The stream may originate from different types of devices, for example, an AR headset, a handheld controller, other wearables or derived via hand gestures of the user and delivered via the AR device.

For a single AR session, there may be one or more pose and interactivity stream(s) flowing uplink from one or more users (depending on the single or multi-user scenarios). As a use case, consider two users that are physically collocated and playing a game of tennis where the ball is virtual and the rackets are handheld controllers. Each user is equipped with a glass type head mounted display (HMD) for a mixed reality view of the surroundings. In this case there may be up to four pose and interactivity streams, one for each device (controller and HMD) from each user (e.g., two from each user in this example).

During an AR session, the validity of the pose stream from a device may change, e.g., a user may remove his/her HMD, put down the controller, move out of the play area etc. For multiple devices, it may be required to indicate the validity of a pose stream, set appropriate parameters related to validity and also to indicate which of the devices is to be followed when the pose from two devices or remote end do no match or is not realistic (e.g. the handheld controller is too far from the HMD).

In an augmented reality (AR) or mixed reality (MR) system, pose and interactivity data are streamed and exchanged between the end-user devices over the network for processing. This data may be used for various network provided functions, including but not limited to spatial localization, scene updates, XR object manipulation etc. In a multiuser and/or multi-device scenario, there are, typically, multiple such streams simultaneously flowing to an edge or cloud server for processing.

The examples described herein relate to i) defining the validity of a pose and interaction stream during the session; and ii) appropriately signaling the parameters that define the validity as well as signaling the current state of validity for two main purposes: a. to reduce the communication for pose correction, b. to implement full- or semi-pose correction based on some probability models; and iii) signaling the threshold for optional server-side assistance when the validity confidence score or value is low. Server-side assistance may try to re-estimate and recover the pose data by other means, such as, historical pose data received during the session, or any other techniques.

In an embodiment, the validity criteria are set as part of the RTP pose delivery session but the validity criteria are measured by the RTP pose sender device with appropriate labelling of the validity state information. This is important for scenarios such as proximity to a real-world object or physical space characteristics, which can be measured by the AR device (RTP pose sending device) but cannot be validated to be true or false by the server. Consequently, it is not always sufficient to have commonly agreed validity criteria parameters. Rather, it is useful to also signal the validity state in the RTP pose payload. The receiver of such payload can subsequently process the received data according to application specified requirements or application specific implementations.

In another embodiment, the pose validity criteria can comprise multiple levels. This enables the pose validity level indication to describe the media representation quality level in case of non-uniform content quality being available for different user's viewport positions. This is expected to be of use in the case of volumetric or immersive content generated with viewport dependency criteria. In case of 3DoF omni-directional video consumption, listener pose outside the viewport and margins (e.g. viewport+margins) is labelled "invalid" if the content availability is limited to viewport and margins (e.g. viewport+margins). In case of volumetric content, some voxels may be available at full quality while others not at all.

The XR device (e.g. HMD, AR glasses, handheld controller etc.) pose gives the position, or translation and orientation of a device with respect to a coordinate system. The XR device pose may be represented as a translation and rotation matrix or quaternions, or any other format. When a position is applied, a set of Cartesian coordinates (x,y,z) and rotation may be used. Pose may be expressed in global or local coordinates and may also include a geolocation, e.g. in an Earth-centered, Earth-fixed coordinate (ECEF) system. Device interaction may include an input from a user or sensory machine, such as a clicked button, a hand gesture, etc. that corresponds to a specific action and/or command. During an XR session, pose and interaction data may be streamed from one or more devices to a network element for processing. Such a network element may be located on the edge or cloud network. The stream may be processed for different functions e.g. localization of devices, scene updates, pre-rendering, activation of specific commands/requests etc.

FIGS. 1-4 share sample setups.

FIG. 1 shows a sample setup involving two users (102, 122) in possession of three devices each, such that, each device's data is being sent upstream to an application server. The streams are shown independently in the figure but can also be multiplexed. Thus, FIG. 1 shows user 1 (102) in possession of device 104, device 106, and device 108, and user 2 (122) in possession of device 124, device 126, and device 128. Devices (104, 106, 108) send pose and interactivity data (respectively 110, 112, 114) to application/media server 140, and receive pose and interactivity data (respectively 110, 112, 114) from application/media server 140. Devices (124, 126, 128) send pose and interactivity data (respectively 130, 132, 134) to application/media server 140, and receive pose and interactivity data (respectively 130, 132, 134) from application/media server 140.

Figure 2:
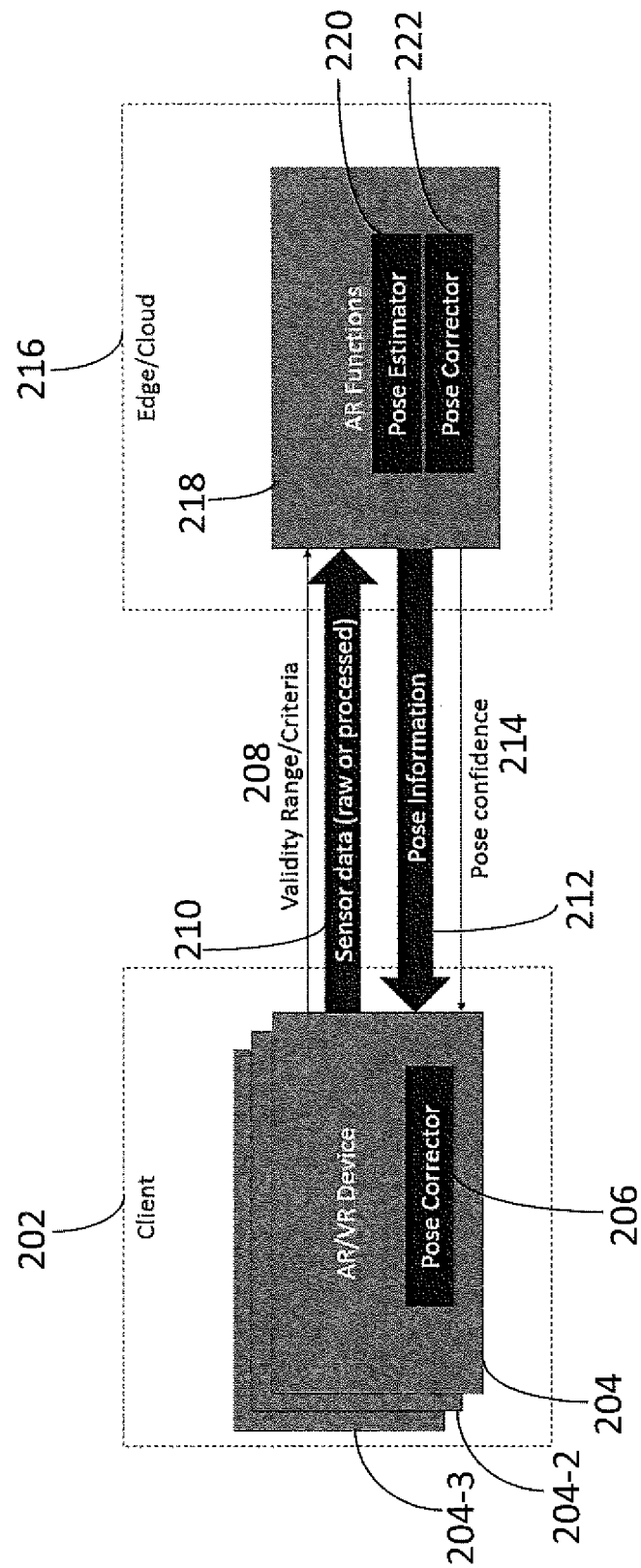
FIG. 2 shows a sample network pose estimation setup.

The sample network pose estimation setup of FIG. 2 shows a client 202 that sends sensor data 210 from one or more devices (AR/VR devices 204, 204-2, 204-3), which sensor data 210 can be raw or processed, to a network based AR function 218 that does pose estimation. The client 202, with the one or more AR/VR devices (204, 204-2, 204-3), also signals a validity range or criteria (208) to the AR function 218. The AR function 218 includes a pose estimator 220, that estimates the pose based on the data from the AR/VR device (204, 204-2, 204-3). The pose information 212 is sent to the device (204, 204-2, 204-3) along with a pose confidence 214.

As further shown in FIG. 2, the AR function 218 is part of an edge/cloud network element 216. The AR function 218 includes a pose corrector 222 for correcting pose, and the AR/VR device 204 includes a pose corrector 206 for correcting pose. The AR/VR devices (204-2, 204-3) each include a pose corrector.

Figure 3:
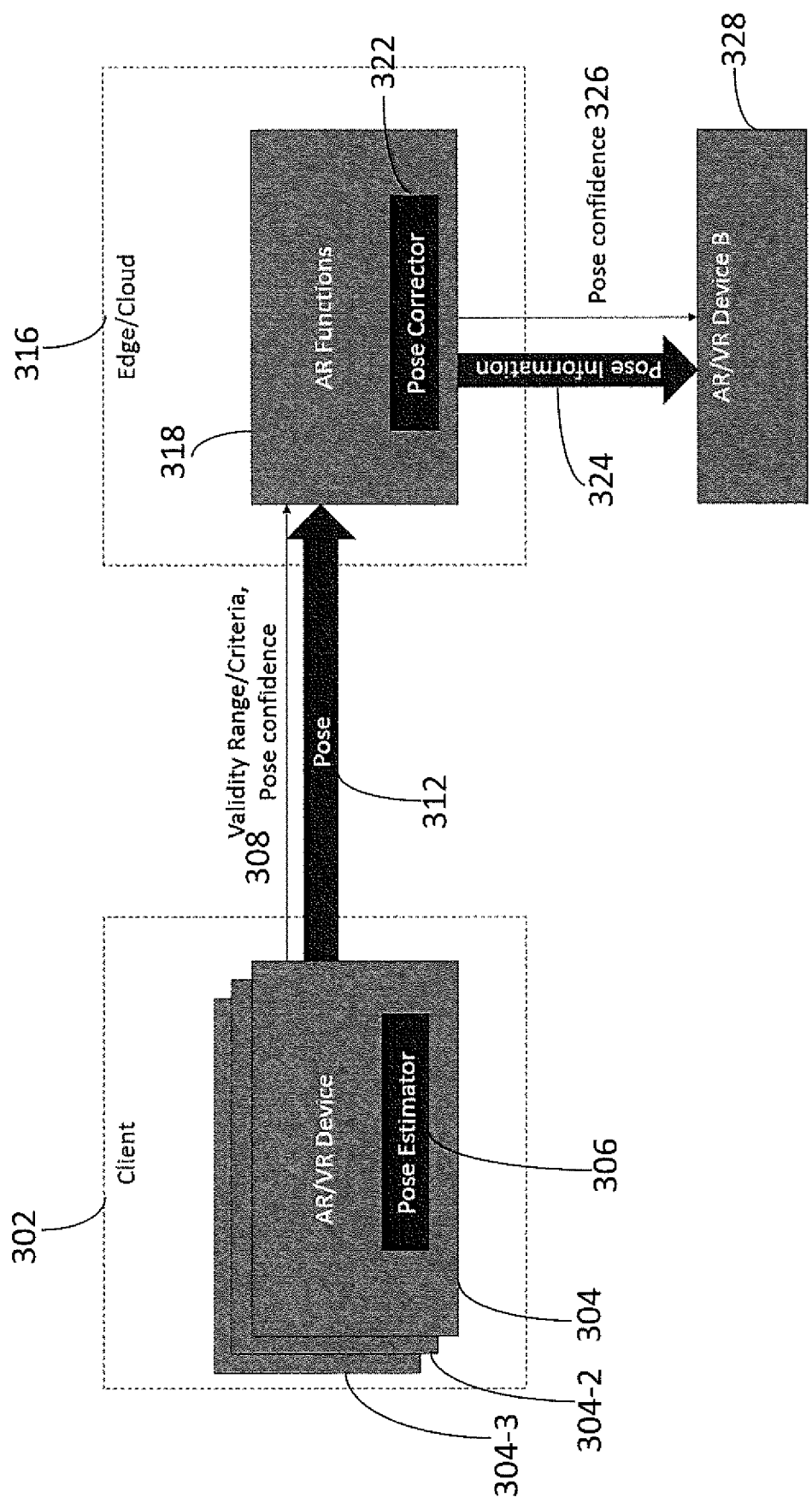
FIG. 3 shows a sample network pose correction setup.

The sample network pose correction setup of FIG. 3 shows a client 302 with one or more AR/VR devices (304, 304-2, 304-3) that sends, using the one or more AR/VR devices (304, 304-2, 304-3) pose information 312 to a network based AR function 318 that does pose correction. The client 302, with the one or more AR/VR devices (304, 304-2, 304-3), also signals a pose confidence 308 to the AR function 318. The AR function 318 includes a pose corrector 322, that corrects the pose based on the data from the AR/VR device (304, 304-2, 304-3). The pose information 324 is sent to another device or network entity 328 (e.g. application server) along with a pose confidence 326.

As further shown in FIG. 3, the AR function 318 is part of an edge/cloud network element 316. The AR/VR device 304 includes a pose estimator 306. The AR/VR devices (304-2, 304-3) each include a pose estimator.

Figure 4:
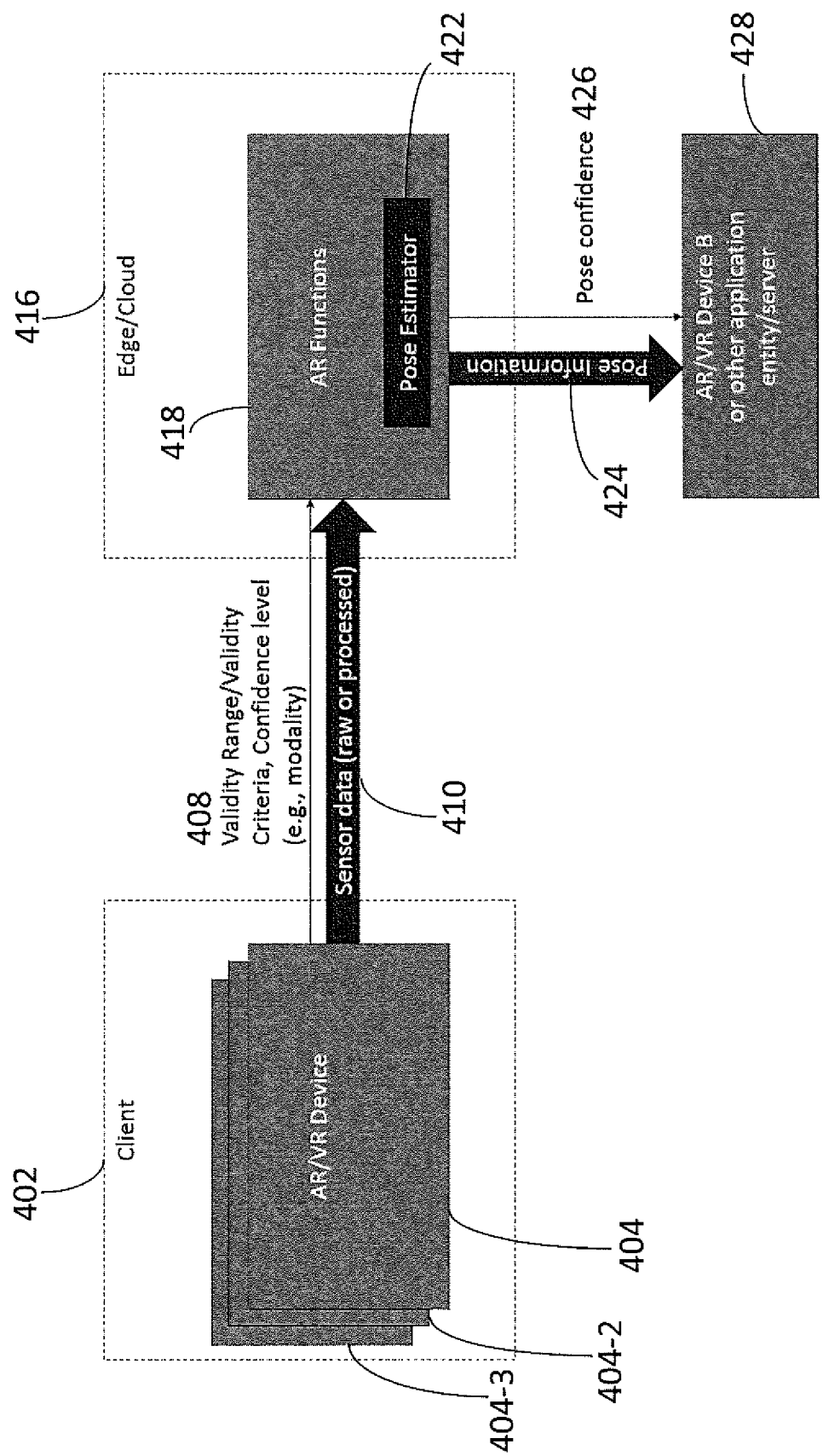
FIG. 4 shows a sample network pose estimation setup.

The sample network pose estimation setup of FIG. 4 shows a client 402 that sends, with one or more AR/VR devices (404, 404-2, 404-3), sensor data 410, which sensor data 410 can be raw or processed, to a network based AR function 418 that does pose estimation. The client 402, with the one or more AR/VR devices (404, 404-2, 404-3), can signal a validity range or criteria 408 to the AR function 418 and a modality value (e.g. as part of 408) for the sensors/device (404, 404-2, 404-3). The AR function 418 includes a pose estimator 422 that estimates the pose based on the data (408, 410) from the AR/VR device (404, 404-2, 404-3). The pose information 424 is sent to another device (possibly another user) or network entity (e.g. application server), collectively 428, along with a pose confidence 426. As shown in FIG. 4, the AR function 418 is part of an edge/cloud network element 416.

Validity range (208, 308, 408): Defines a range of values for the sensor, pose or interactivity data (210, 312, 410) in a stream for which the values should be considered valid. The validity range for one device/client/sensor may be defined as dependent on another device/client/sensor.

Validity indicator (608, 614): An indicator that establishes validity of the sensor, pose or interactivity data in a stream. The indicator can be a standalone value (e.g. a flag) or it may provide a context.

Pose confidence (214, 308, 326, 426): A confidence level assigned to an estimated pose. The pose confidence level can be indicated as an index or range that indicates accuracy of the pose information.

Pose Data

A pose (e.g. 110, 112, 114, 130, 132, 134) contains the information about the absolute coordinates with respect to the origin of the coordinate system in the scene or physical world. The pose can also include the relative transformation data like translation and rotation.

A pose confidence (214, 308, 326, 426) can be used to indicate the level of confidence if the pose data is calculated by the player devices. The confidence value can be shared to the server or other players directly.

The pose confidence level can be indicated as an index or range that indicates accuracy of the pose information.

A "pose estimator" (220, 306, 422) is tasked with 1) server-side pose estimation/calculation; and 2) server-side pose correction (e.g. 206, 222, 322), in case the confidence score of the pose validity is low or below some threshold value.

An end-end solution based on a recurrent neural network can be used to solve this problem. A data driven temporal inverse kinematic (IK) based on a RCNN can predict consistent subject pose (e.g. a motion capture format like BVH (BioVision Hierarchical data [refer to M. Meredith et al., Motion Capture File Formats Explained, Department of Computer Science, University of Sheffield]) format) from a standard VR headset and controller pose inputs. The corrected/improved HMD and controller poses can thereafter be accurately inferred based on their placement on human body joints. The incorporated RCNN is trained to exploit the temporal consistency of human motion and interactions. In addition, the model can be trained to produce a confidence error level which enables the media service to make just decisions. The BVH format representation enables the approach to be easily applied to any VR system that supports 6-DOF tracking on the headset and controllers. The real-time process starts in the input extraction module, where the position and rotation of the headset and controllers can be queried. The data is sent to the RNN, where it is pre-processed and sent to the neural network framework in the "pose estimator". The RNN model runs through the data and outputs consistent pose predictions with a confidence level. The model can be trained on several hours of motion capture recordings of subjects using VR based on the explained setup. Human motion data can be represented with a joint representation in BVH format which makes it easy to retrieve the location of the controllers.

In one example, the pose data can be represented by the format of MPEG Visual Volumetric Video-based (V3C) Coding for the sake of good compatibility, and device pose information can be defined inside the ExtCameraInfo syntax element 500 in the standard representation (see FIG. 5) by specifying rotation as quaternion (508, 510, 512) and translation as pos_x, pos_y, _pos_z (502, 504, 506) respectively. The media server can retrieve full sets of pose data passed through the RCNN method, when server-side pose assistance and estimation is required. Accordingly, FIG. 5 shows a single (V3C) pose representation 500 in ExtCameraInfo.

In an embodiment, pose or sensor data confidence can be a modality that indicates the type of device that is used to collect the information, e.g., certain devices may capture the pose better than others and would require less correction.

Validity Range

A device or application can have a valid range of operation or validity range (208, 308, 408) that defines the area in which the user device should be for proper operation. For example, an application may operate within a fixed boundary of a 3×3 meter square box, or a sphere, or any other geometric shapes. The range is different from the bounding box or sphere (aka. bounding volume [refer e.g. to https://en.wikipedia.org/wiki/Bounding_volume]) commonly used in computer graphics for view frustum culling. The validity range can share some geometric features of bounding volume, though, if it is supported and auto-defined by the system. The user/application, typically, can define the location of this box prior to starting the media sessions. Then the pose is no longer valid when the device is outside this range. A user application may issue warnings to the user when the device is going out of range. This type of validity range may be used for defining a safety box/play area for the user. A play area is an area in the physical world where a user can use the AR/VR application.

In some applications the validity range may change over time. For example, the validity range may be modified to a portion of the entire play area for a particular level of a game. In another example, the validity range may be changed depending on the number and locations/pose of the other players sharing the same play area. In this case the server may signal the validity range to the device at runtime. A device that is streaming pose and/or an interactivity stream as an RTP stream may receive the validity range updates from the server via RTCP feedback reports. If the validity range is defined by the device, it can be signaled using an RTP header extension or as an RTP payload.

Example Embodiment of Validity Region Specification:

The validity region can be a volume as specified below in a syntax element. In different implementation embodiments, the validity region can also be a mesh defined by triangular faces.

```
aligned(8) class ValidityVolumeStruct( ) {
    unsigned int(4) reference_type;
    if(reference_type==0)
        GeoCoordinatesStruct( );//lat and lon values
    else if(reference_type==1)
        unsigned int(16) HeadHeightOffset;//offset from
the ground in meters
    else if(reference_type==2)
    unsigned int(8) DeviceId;//offset from the ground in
meters
    unsigned int(16) lenX;// in meters
    unsigned int(16) lenY;// in meters
    unsigned int(16) lenZ;// in meters
    signed int(32) Yaw;//−180 to 180
    signed int(16) Pitch;//−90 to 90
}
``` signed int(16) Roll;//−90 to 90

Table 1 shows a mapping of the semantics for different reference type values.

TABLE 1

| reference_type value | Semantics |
| --- | --- |
| 0 | World locked GPS reference |
| 1 | Body locked i.e. reference is the user's HMD position. |
| 2 | Device specific (e.g., mutual proximity between devices, a controller cannot be more than 2 m away from an HMD for most typical user demography, or from another device owned by the same user, or from another device owned by another user) |
| 3 | Reserved |

In an embodiment the validity range may be the range of biometric data, e.g., heart rate. In another embodiment the validity range may be device operation metrics, e.g., operating temperature or surrounding noise. In another embodiment the validity range may be environmental data, e.g., humidity or temperature of the surroundings.

An SDP attribute, a=validityrange can be used to define a validity range for an RTP stream with the following syntax: validityrange=id type <range> [unit]

The id element is an identifier that is unique to this validityrange for the session. The id value can be used in the RTP/RTCP signaling to indicate changes in the validity range of the stream. The type defines the type of range. For example, the type can be specified as the play area range, device operation range or biometric marker range as described in the examples above. A list of types may be defined, to ensure interoperability, that are included in the parameter. Each type can have a specific format for the range parameter. The range parameter can then be included as base64. In addition, it can be defined how the range is implemented. For example, a range may be defined as [x,y], (x,y], [x,y) or (x,y), such that the date is valid within the range x and y, including or excluding x and y depending on the definition. In a different implementation, the range may be defined such that the data is valid when it is not within that range. An optional parameter for units can be added.

In an embodiment, the RTP/RTCP signaling is used with the validityrange id to modify the validityrange defined for that id. In another embodiment, the RTP/RTCP signaling may use the id as defined in the SDP to indicate the defined validityrange for that value would now apply to this RTP/RTCP stream.

In an embodiment, the type may be set to URI and the x, y range is a URI. The resource at the URI provides the format and the value of the validity range.

In an embodiment, the validity region is used to implement viewport dependent delivery. In this case, the validity region is the high-quality region in the delivered media, which may be the viewport and margin regions. The viewport is the last known orientation of the device. The viewport margins are additional regions around the viewport that are delivered at a quality equivalent to the viewport or lower than the viewport but higher than the background region. The background region is delivered at low-quality or not delivered at all since there is low probability of the client viewing these regions. The validity region consisting of viewport and margin is signaled from the server to the client and the client knows that it should stay within this region for good experience. This can apply to 3DoF, 3DoF+ and 6DOF viewport-dependent delivery.

Stop Signal

A pose confidence of a device may be changed. Such changes may be co-related to the position where the player is in the validity range. For instance, a pose confidence of a device may be dependent on the player position within the validity range. Also for instance, lower confidence may indicate that the user is situated close to the border of the validity range. A device whose pose is no longer valid, e.g. its confidence drops to zero, may stop sending pose updates temporarily until it returns to a valid range. A stop signal is defined herein for indicating that the stream is to be stopped because device pose is not in a valid range. For example, a device that is sending an RTP stream with pose and an interaction stream may send the stop signal when the device is not in the validity range. The stop signal temporarily pauses the stream without disconnecting the session. This indicates to both sides that the stream was paused due to an invalid range and not because of some network problems. When RTP is used, the stop signal may be part of the payload in the RTP stream or the stop signal can be an RTP header extension. A client or server may use RTCP feedback for sending the stop signal.

During a session with multiple users and/or multiple devices, the validity of one device pose may be dependent on another stream from another device or another user. For example, in shared spaces, only one user may be permitted at a time, i.e., if user1 is playing the bonus round, the other players should wait. In another example, it may be that the device controller is too far from the head-mounted display. In this case the pose stream from the other devices can be temporarily paused. The server can use pause/resume RTCP feedback to pause and resume a pose stream. However, if the pause/resume is used for more than one reason, additional information on the cause of pausing a stream can be sent via the RTCP feedback message. For example, pose streams may be paused due to maximum players, server load, a device being outside validity range etc.

In an embodiment of the implementation, the server can re-define or reconfigure validity regions regarding user movement to constrain the expected media data delivery. Such a constrained user movement has to be accompanied with appropriate user indication to avoid unexpected behavior. Thus, the validity parameter as well as validity status signaling provides an important handle to enable graceful degradation or error handling by the server. For example, if the controller is by mistake forgotten by the user, the server shall use the last valid value to render the AR scene instead of rendering the AR scene with an erroneous user position.

Validity Indicator

Figure 6A:
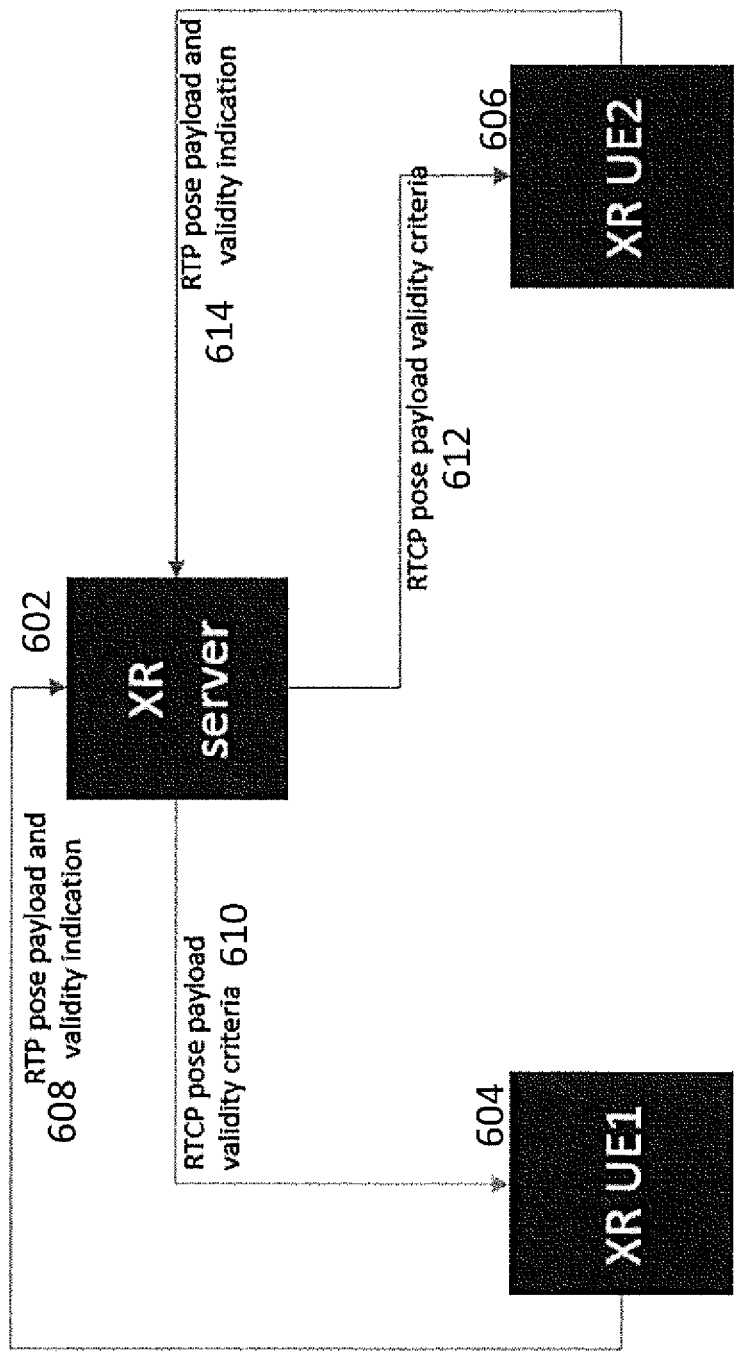
FIG. 6A depicts RTP pose signaling with a validity status.

The pose validity may also be indicated within the payload of the pose RTP stream using a validity indicator structure. This is shown in FIG. 6A and FIG. 6B. FIG. 6A shows RTP pose signaling with validity status. RTCP can be used to modify validity range parameters. FIG. 6B shows an example RTP pose payload 650.

As shown in FIG. 6A, XR UE 1 604 provides an RTP pose payload and validity indication 608 to the XR server 602, and receives RTCP pose payload validity criteria 610 from the XR server 602. XR UE 2 606 provides an RTP pose payload and validity indication 614 to the XR server 602, and receives RTCP pose payload and validity criteria 612 from the XR server 602.

As shown in FIG. 6B, the RTP pose payload 650 includes a first packet 660 and second packet 670. The first packet 660 includes validity criteria 662, pose information 664, and a pose validity status 666. The second packet 670 includes a reference to previous criteria 672, pose information 674, and a pose validity status 676.

In its simplest form, the validity indicator (608, 614) may be a set of flags that indicate the status of the device (604, 606). Possible values may be VALID, INVALID, USER_DISTRESS, DEVICE_INVALID, NEAR_BOUNDARY with the following semantics:

VALID: The pose/device is within the defined validity range.

INVALID: The pose/device is not within the defined validity range.

USER_DISTRESS: The user's biometric markers are not within the defined validity range.

DEVICE_INVALID: The device's performance conditions are not within the defined validity range.

NEAR_BOUNDARY: The current pose/device is near the boundary of the validity range. If there is more than one validity range (there are a plurality of validity ranges), this flag may be indicated for each validity range separately.

In an embodiment, the validity indicator (608, 614) may provide additional context. For example, the validity indicator of device B 606 may depend on whether device A 604 is operating within the validity range. For RTP and SDP based setup, if data (pose, sensor, interaction, other media) for device A and device B are being transmitted using RTP streams, then the validity indicator (608, 614) may be an SDP attribute vi defined as below:

vi=criteria:<mid1>, criteria:<mid2> . . . criteria,<midn>
criteria=invalid|ifactive|validityrangeid vi is included as an attribute under the media line of the RTP stream (pose, sensor, interaction, other media) for which it indicates the validity. The values mid1, mid2, . . . midn are the mid values of the other RTP streams on which the validity of this RTP stream depends on. The criteria defines the condition for validity. For example, the vi can be set to vi=ifvalid:mid1

In an embodiment the vi attribute may include a criteria and mid of the media stream for which the vi attribute indicates the validity.

This indicates that if the RTP stream with mid1 is invalid then this stream is also invalid. The receiver of the streams may pause receiving certain streams based on this validity indication.

A criteria could be a validityrange id as defined in the validityrange attribute. Some example SDPs are provided in FIG. 7A and FIG. 7B. The examples use video RTP streams but the usage is valid for any pose, sensor or interactivity or audio stream sent over RTP.

FIG. 7A shows an SDP example 700 for defining a validity indicator of one RTP stream based on another. The example uses video RTP streams but the usage is valid for any pose, sensor or interactivity or audio stream. The SDP example 700 includes RTP streams 702 and 710, and SDP attributes 704, 706, 708, 712, and 714.

FIG. 7B is an SDP example 750 that shows two validityrange ids (752, 754) defined at a session level. The SDP example 750 shows RTP streams (756, 764) and attributes (758, 760, 762, 766, 768, 770).

mid 1 RTP stream 756 is valid if mid 2 data is within the validityrange 667 (range2 754)

mid 2 RTP stream 764 is valid if mid 2 data is within the validityrange 666 (range1 752)

In an embodiment, the vi attribute may be included at the session level and in this case the vi attribute would include the identifier (mid) of the media stream to which the vi attribute applies. The syntax can be:

vi=midz criteria:<mid1>, criteria:<mid2> . . . criteria, <midn> where midz is the mid of the media stream to which the attribute applies.

Heartbeat

A client (604, 606) or server (602) may send a heartbeat signal to check if the pose stream is still valid. The heartbeat may be sent using an RTCP feedback message or it may be sent completely out-of-band, e.g., using a WebRTC data channel, SDP or HTTP socket. The heartbeat signal can be used also for reporting device conditions, e.g., current operating conditions of the device, biometrics of the user, etc. In this case the information may be used by the server or client to initiate pause/resume for the pose and interactivity streams.

The defined signals can use RTP/RTCP, SDP, HTTP, SIP or other protocol. Signaled values can be seen (are visible) within an implementation of the examples described herein.

Figure 8:
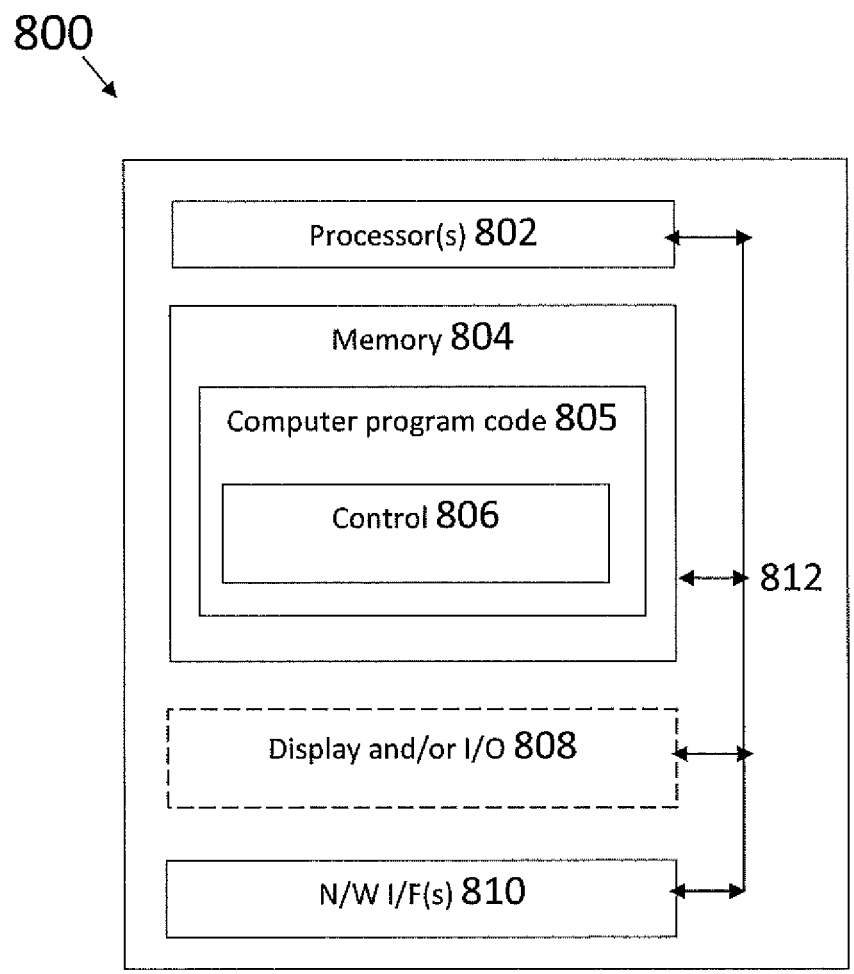
FIG. 8 is an example apparatus configured to implement the examples described herein.

FIG. 8 is an example apparatus 800, which may be implemented in hardware, configured to implement the examples described herein. The apparatus 800 includes at least one processor 802 (e.g. an FPGA and/or CPU), at least one memory 804 including computer program code 805, wherein the at least one memory 804 and the computer program code 805 are configured to, with the at least one processor 802, cause the apparatus 800 to implement circuitry, a process, component, module, or function (collectively control 806) to implement the examples described herein, including pose validity for XR based services. The memory 804 may be a non-transitory memory, a transitory memory, a volatile memory, or a non-volatile memory.

The apparatus 800 optionally includes a display and/or I/O interface 808 that may be used to display aspects or a status of the methods described herein (e.g., as one of the methods is being performed or at a subsequent time), or to receive input from a user. The apparatus 800 includes one or more network (N/W) interfaces (I/F(s)) 810. The N/W I/F(s) 810 may be wired and/or wireless and communicate over the Internet/other network(s) via any communication technique. The N/W I/F(s) 810 may comprise one or more transmitters and one or more receivers. The N/W I/F(s) 810 may comprise standard well-known components such as an amplifier, filter, frequency-converter, (de)modulator, and encoder/decoder circuitries and one or more antennas.

The apparatus 800 to implement the functionality of control 806 may be an XR UE (604, 606) or XR server 602, or any of the other devices shown in FIG. 1, FIG. 2, FIG. 3, or FIG. 4, including application/media server 140, the devices possessed by the users (102, 122), the AR/VR devices (204, 304, 404) and AR functions (218, 318, 418). Apparatus 800 may be part of a self-organizing/optimizing network (SON) node, such as an edge/cloud (216, 316, 416).

The apparatus 800 may also be distributed throughout a network including within and between apparatus 800 and any network element, such as the client (202, 302, 402) and edge/cloud (216, 316, 416). Apparatus 800 may be virtualized or subject to virtualization.

Interface 812 enables data communication between the various items of apparatus 800, as shown in FIG. 8. For example, the interface 812 may be one or more buses such as address, data, or control buses, and may include any interconnection mechanism, such as a series of lines on a motherboard or integrated circuit, fiber optics or other optical communication equipment, and the like. Computer program code 805, including control 806 may comprise object-oriented software configured to pass data/messages between objects within computer program code 805. The apparatus 800 need not comprise each of the features mentioned, or may comprise other features as well.

Figure 9:
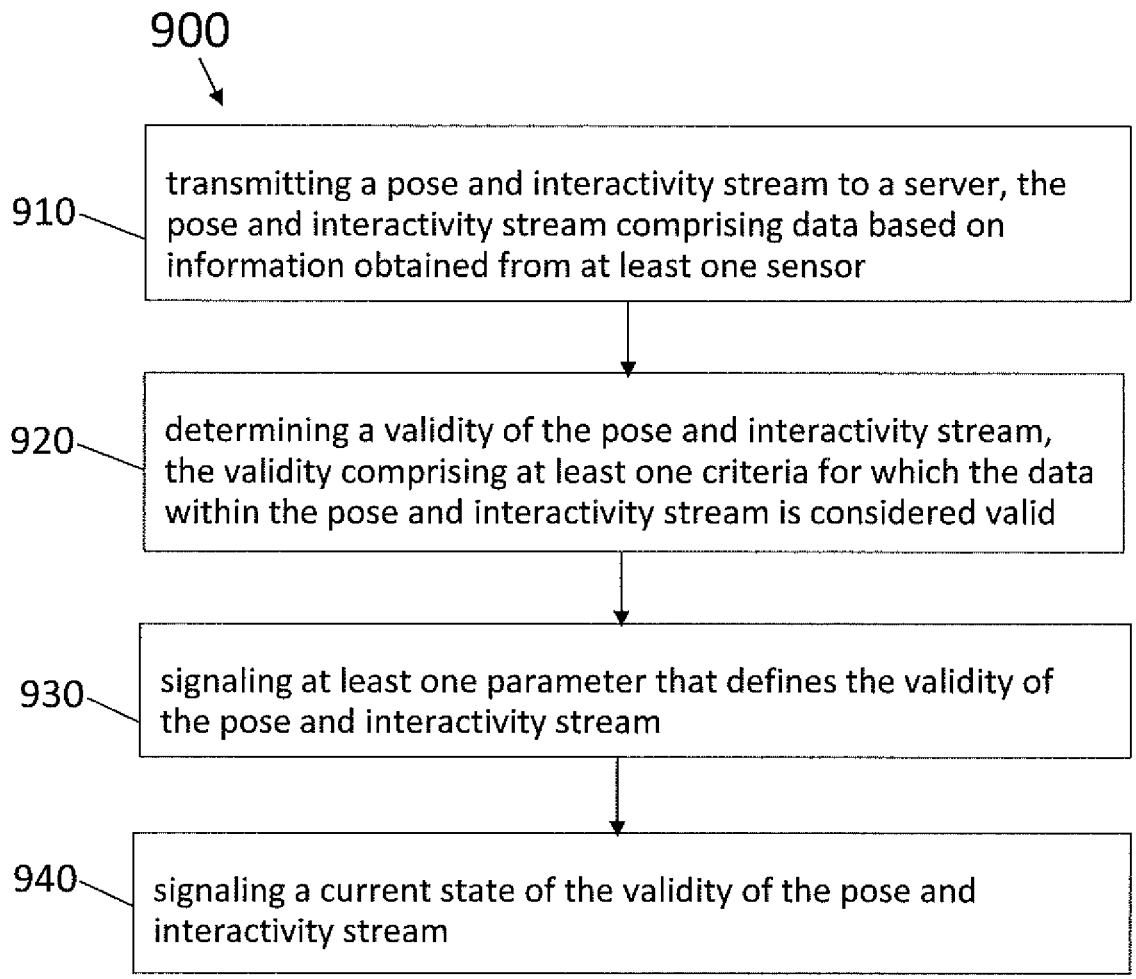
FIG. 9 is an example method to implement the examples described herein.

FIG. 9 is an example method 900 to implement the example embodiments described herein. At 910, the method includes transmitting a pose and interactivity stream to a server, the pose and interactivity stream comprising data based on information obtained from at least one sensor. At 920, the method includes determining a validity of the pose and interactivity stream, the validity comprising at least one criteria for which the data within the pose and interactivity stream is considered valid. At 930, the method includes signaling at least one parameter that defines the validity of the pose and interactivity stream. At 940, the method includes signaling a current state of the validity of the pose and interactivity stream. Method 900 may be performed with a client device.

Figure 10:
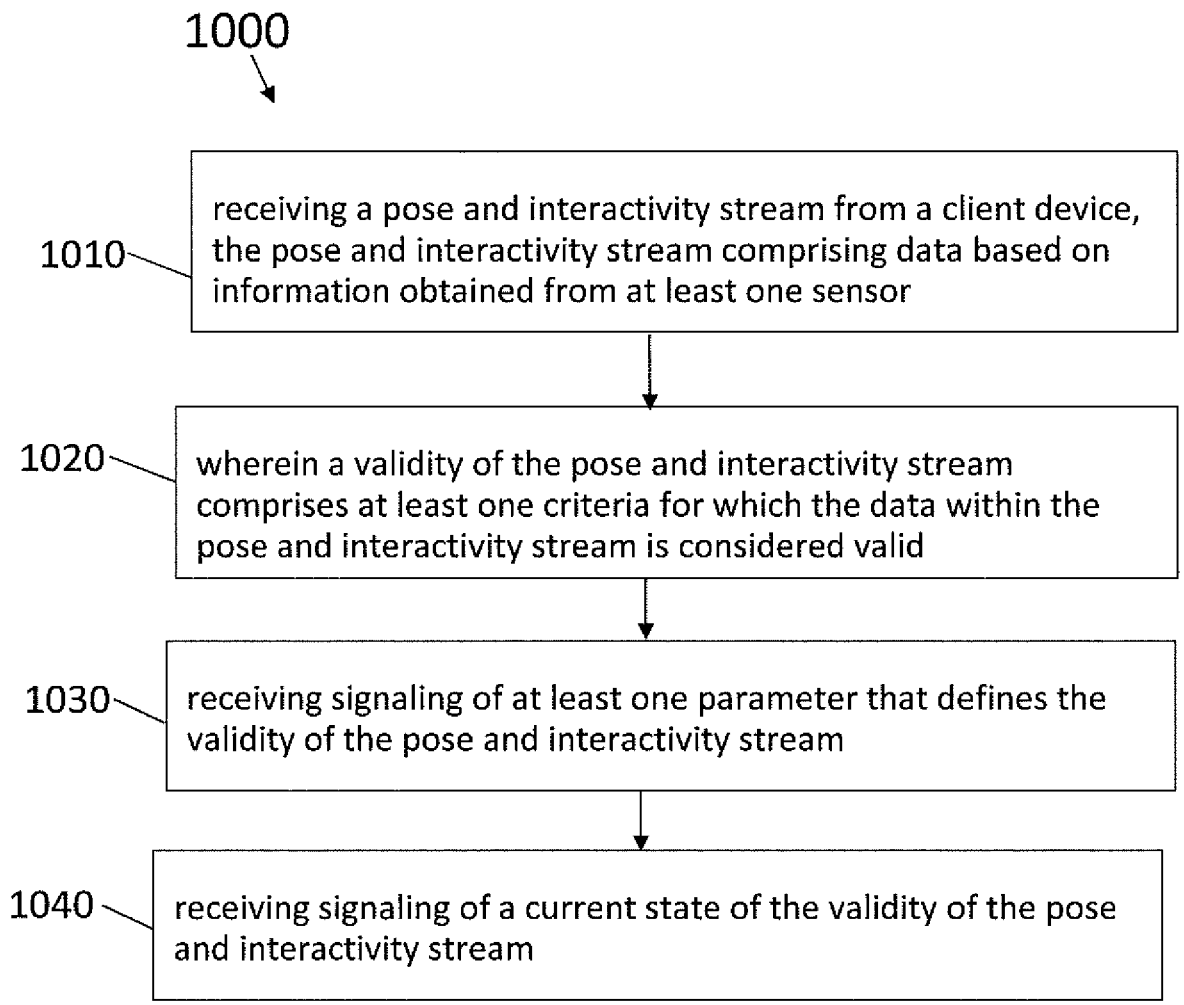
FIG. 10 is an example method to implement the examples described herein.

FIG. 10 is an example method 1000 to implement the example embodiments described herein. At 1010, the method includes receiving a pose and interactivity stream from a client device, the pose and interactivity stream comprising data based on information obtained from at least one sensor. At 1020, the method includes wherein a validity of the pose and interactivity stream comprises at least one criteria for which the data within the pose and interactivity stream is considered valid. At 1030, the method includes receiving signaling of at least one parameter that defines the validity of the pose and interactivity stream. At 1040, the method includes receiving signaling of a current state of the validity of the pose and interactivity stream. Method 1000 may be performed with a server.

Figure 11:
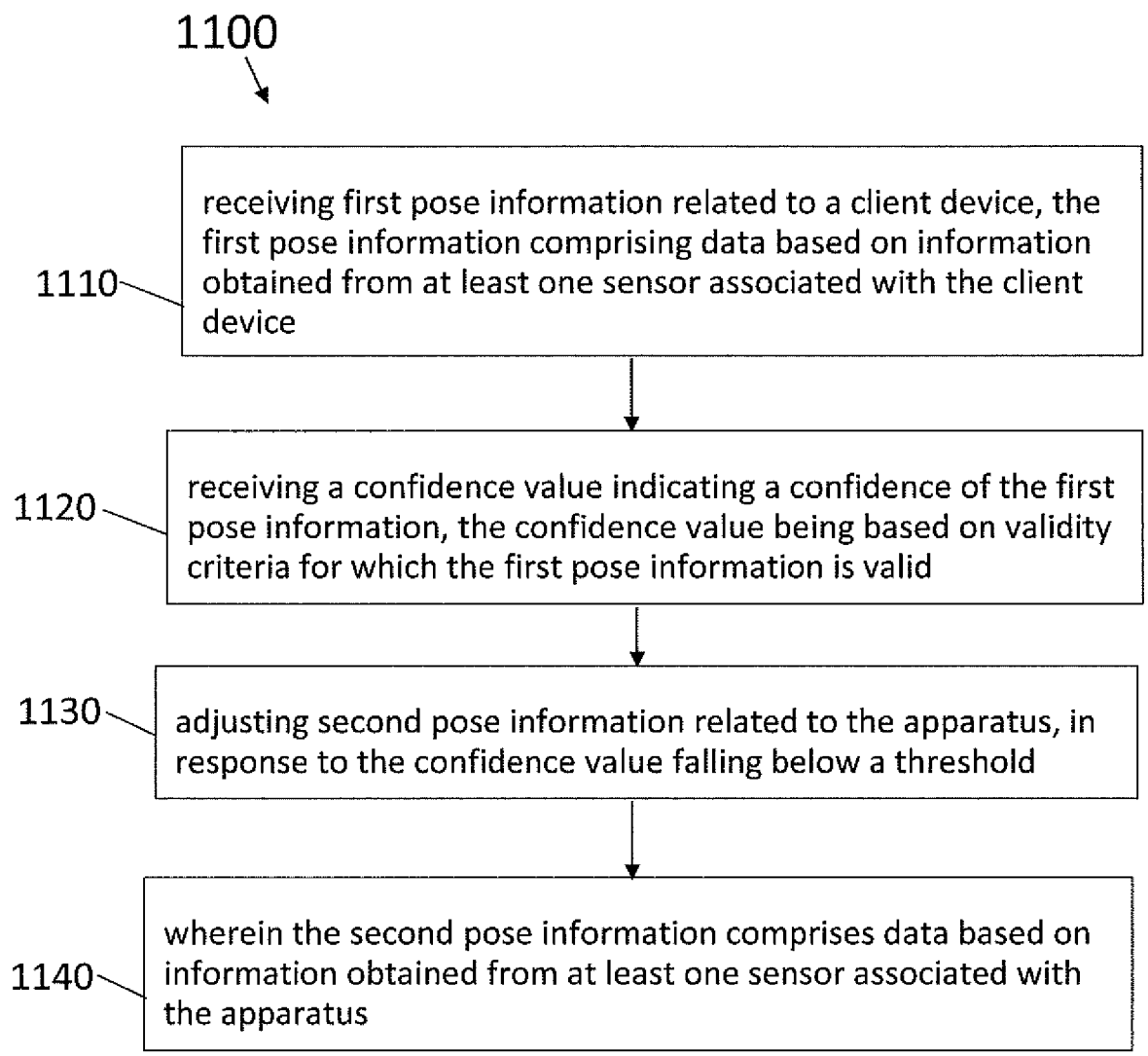
FIG. 11 is an example method to implement the examples described herein.

FIG. 11 is an example method 1100 to implement the example embodiments described herein. At 1110, the method includes receiving first pose information related to a client device, the first pose information comprising data based on information obtained from at least one sensor associated with the client device. At 1120, the method includes receiving a confidence value indicating a confidence of the first pose information, the confidence value being based on validity criteria for which the first pose information is valid. At 1130, the method includes adjusting second pose information related to the apparatus, in response to the confidence value falling below a threshold. At 1140, the method includes wherein the second pose information comprises data based on information obtained from at least one sensor associated with the apparatus. Method 1100 may be performed with a client device.

References to a 'computer', 'processor', etc. should be understood to encompass not only computers having different architectures such as single/multi-processor architectures and sequential or parallel architectures but also specialized circuits such as field-programmable gate arrays (FPGAs), application specific circuits (ASICs), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

The memory(ies) as described herein may be implemented using any suitable data storage technology, such as semiconductor based memory devices, flash memory, magnetic memory devices and systems, optical memory devices and systems, non-transitory memory, transitory memory, fixed memory and removable memory. The memory(ies) may comprise a database for storing data.

As used herein, the term 'circuitry' may refer to the following: (a) hardware circuit implementations, such as implementations in analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. As a further example, as used herein, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

The following examples (1-29) are provided and described herein.

Example 1: An apparatus includes at least one processor; and at least one memory including computer program code; wherein the at least one memory and the computer program code are configured to, with the at least one processor, cause the apparatus at least to: transmit a pose and interactivity stream to a server, the pose and interactivity stream comprising data based on information obtained from at least one sensor; determine a validity of the pose and interactivity stream, the validity comprising at least one criteria for which the data within the pose and interactivity stream is considered valid; signal at least one parameter that defines the validity of the pose and interactivity stream; and signal a current state of the validity of the pose and interactivity stream.

Example 2: The apparatus of example 1, wherein the at least one memory and the computer program code are further configured to, with the at least one processor, cause the apparatus at least to: signal a threshold for assistance from the server when a validity confidence score or validity value is low; and receive assistance from the server when the validity confidence score or validity value is lower than the threshold, the assistance comprising a correction of the data within the pose and interactivity stream.

Example 3: The apparatus of any one of examples 1 to 2, wherein the at least one memory and the computer program code are further configured to, with the at least one processor, cause the apparatus at least to: determine a confidence score that indicates a confidence of the pose data within the pose and interactivity data, and transmit the confidence score to the server or to a device; or receive from the server or the device the confidence score that indicates the confidence of the pose data within the pose and interactivity data.

Example 4: The apparatus of example 3, wherein the confidence score is determined based on at least one of: a neural network trained on motion capture recordings of a plurality of users, or a type of the apparatus.

Example 5: The apparatus of any one of examples 1 to 4, wherein the at least one parameter that defines the validity of the pose and interactivity stream is signaled within a payload as part of a real time transport protocol delivery session, and the current state of the validity of the pose and interactivity stream is signaled within the payload as part of the real time transport protocol delivery session.

Example 6: The apparatus of any one of examples 1 to 5, wherein the validity comprises multiple levels corresponding to non-uniform media representation quality of the pose and interactivity stream for different viewport positions of a user.

Example 7: The apparatus of any one of examples 1 to 6, wherein the at least one parameter that defines the validity of the pose and interactivity stream is based on at least one of: biometric data, a device operation metric, environmental data, or a dependency on a device different from the apparatus.

Example 8: The apparatus of any one of examples 1 to 7, wherein the at least one memory and the computer program code are further configured to, with the at least one processor, cause the apparatus at least to: stop transmission of the pose and interactivity stream, in response to a confidence score falling below a value, the confidence score indicating a confidence of the pose data within the pose and interactivity data.

Example 9: The apparatus of any one of examples 1 to 8, wherein the at least one memory and the computer program code are further configured to, with the at least one processor, cause the apparatus at least to: receive a heartbeat signal to determine whether the pose and interactivity stream is still valid; and transmit a response to the heartbeat signal to indicate the validity of the data within the pose and interactivity stream.

Example 10: An apparatus includes at least one processor; and at least one memory including computer program code; wherein the at least one memory and the computer program code are configured to, with the at least one processor, cause the apparatus at least to: receive a pose and interactivity stream from a client device, the pose and interactivity stream comprising data based on information obtained from at least one sensor; wherein a validity of the pose and interactivity stream comprises at least one criteria for which the data within the pose and interactivity stream is considered valid; receive signaling of at least one parameter that defines the validity of the pose and interactivity stream; and receive signaling of a current state of the validity of the pose and interactivity stream.

Example 11: The apparatus of example 10, wherein the at least one memory and the computer program code are further configured to, with the at least one processor, cause the apparatus at least to: receive signaling of a threshold for assistance from the client device when a validity confidence score or validity value is low; and transmit assistance to the client device when the validity confidence score or validity value is lower than the threshold, the assistance comprising a correction of the data within the pose and interactivity stream.

Example 12: The apparatus of any one of examples 10 to 11, wherein the at least one memory and the computer program code are further configured to, with the at least one processor, cause the apparatus at least to: determine a confidence score that indicates a confidence of the pose data within the pose and interactivity data, and transmit the confidence score to the client device or to a device different from the client device; or receive from the client device or the device different from the client device the confidence score that indicates the confidence of the pose data within the pose and interactivity data.

Example 13: The apparatus of example 12, wherein the confidence score is determined based on at least one of: a neural network trained on motion capture recordings of a plurality of users, or a type of the client device.

Example 14: The apparatus of any one of examples 10 to 13, wherein the at least one parameter that defines the validity of the pose and interactivity stream is signaled within a payload as part of a real time transport protocol delivery session, and the current state of the validity of the pose and interactivity stream is signaled within the payload as part of the real time transport protocol delivery session.

Example 15: The apparatus of any one of examples 10 to 14, wherein the validity comprises multiple levels corresponding to non-uniform media representation quality of the pose and interactivity stream for different viewport positions of a user.

Example 16: The apparatus of any one of examples 10 to 15, wherein the at least one parameter that defines the validity of the pose and interactivity stream is based on at least one of: biometric data, a device operation metric, environmental data, or a dependency on a device different from the client device.

Example 17: The apparatus of any one of examples 10 to 16, wherein receipt of the pose and interactivity stream is stopped, in response to a confidence score falling below a value, the confidence score indicating a confidence of the pose data within the pose and interactivity data.

Example 18: The apparatus of any one of examples 10 to 17, wherein the at least one memory and the computer program code are further configured to, with the at least one processor, cause the apparatus at least to: transmit a heartbeat signal to the client device to determine whether the pose and interactivity stream is still valid; and receive from the client device a response to the heartbeat signal to indicate the validity of the data within the pose and interactivity stream.

Example 19: An apparatus includes at least one processor; and at least one memory including computer program code; wherein the at least one memory and the computer program code are configured to, with the at least one processor, cause the apparatus at least to: receive first pose information related to a client device, the first pose information comprising data based on information obtained from at least one sensor associated with the client device; receive a confidence value indicating a confidence of the first pose information, the confidence value being based on validity criteria for which the first pose information is valid; and adjust second pose information related to the apparatus, in response to the confidence value falling below a threshold; wherein the second pose information comprises data based on information obtained from at least one sensor associated with the apparatus.

Example 20: The apparatus of example 19, wherein the confidence value is received from a server or the client device.

Example 21: An apparatus includes means for transmitting a pose and interactivity stream to a server, the pose and interactivity stream comprising data based on information obtained from at least one sensor; means for determining a validity of the pose and interactivity stream, the validity comprising at least one criteria for which the data within the pose and interactivity stream is considered valid; means for signaling at least one parameter that defines the validity of the pose and interactivity stream; and means for signaling a current state of the validity of the pose and interactivity stream.

Example 22: An apparatus includes means for receiving a pose and interactivity stream from a client device, the pose and interactivity stream comprising data based on information obtained from at least one sensor; wherein a validity of the pose and interactivity stream comprises at least one criteria for which the data within the pose and interactivity stream is considered valid; means for receiving signaling of at least one parameter that defines the validity of the pose and interactivity stream; and means for receiving signaling of a current state of the validity of the pose and interactivity stream.

Example 23: An apparatus includes means for receiving first pose information related to a client device, the first pose information comprising data based on information obtained from at least one sensor associated with the client device; means for receiving a confidence value indicating a confidence of the first pose information, the confidence value being based on validity criteria for which the first pose information is valid; and means for adjusting second pose information related to the apparatus, in response to the confidence value falling below a threshold; wherein the second pose information comprises data based on information obtained from at least one sensor associated with the apparatus.

Example 24: A method includes transmitting a pose and interactivity stream to a server, the pose and interactivity stream comprising data based on information obtained from at least one sensor; determining a validity of the pose and interactivity stream, the validity comprising at least one criteria for which the data within the pose and interactivity stream is considered valid; signaling at least one parameter that defines the validity of the pose and interactivity stream; and signaling a current state of the validity of the pose and interactivity stream.

Example 25: A method includes receiving a pose and interactivity stream from a client device, the pose and interactivity stream comprising data based on information obtained from at least one sensor; wherein a validity of the pose and interactivity stream comprises at least one criteria for which the data within the pose and interactivity stream is considered valid; receiving signaling of at least one parameter that defines the validity of the pose and interactivity stream; and receiving signaling of a current state of the validity of the pose and interactivity stream.

Example 26: An example method includes receiving first pose information related to a client device, the first pose information comprising data based on information obtained from at least one sensor associated with the client device; receiving a confidence value indicating a confidence of the first pose information, the confidence value being based on validity criteria for which the first pose information is valid; and adjusting second pose information related to the apparatus, in response to the confidence value falling below a threshold; wherein the second pose information comprises data based on information obtained from at least one sensor associated with the apparatus.

Example 27: A non-transitory program storage device readable by a machine, tangibly embodying a program of instructions executable with the machine for performing operations, the operations comprising: transmitting a pose and interactivity stream to a server, the pose and interactivity stream comprising data based on information obtained from at least one sensor; determining a validity of the pose and interactivity stream, the validity comprising at least one criteria for which the data within the pose and interactivity stream is considered valid; signaling at least one parameter that defines the validity of the pose and interactivity stream; and signaling a current state of the validity of the pose and interactivity stream.

Example 28: A non-transitory program storage device readable by a machine, tangibly embodying a program of instructions executable with the machine for performing operations, the operations comprising: receiving a pose and interactivity stream from a client device, the pose and interactivity stream comprising data based on information obtained from at least one sensor; wherein a validity of the pose and interactivity stream comprises at least one criteria for which the data within the pose and interactivity stream is considered valid; receiving signaling of at least one parameter that defines the validity of the pose and interactivity stream; and receiving signaling of a current state of the validity of the pose and interactivity stream.

Example 29: A non-transitory program storage device readable by a machine, tangibly embodying a program of instructions executable with the machine for performing operations, the operations comprising: receiving first pose information related to a client device, the first pose information comprising data based on information obtained from at least one sensor associated with the client device; receiving a confidence value indicating a confidence of the first pose information, the confidence value being based on validity criteria for which the first pose information is valid; and adjusting second pose information related to the apparatus, in response to the confidence value falling below a threshold; wherein the second pose information comprises data based on information obtained from at least one sensor associated with the apparatus.

It should be understood that the foregoing description is only illustrative. Various alternatives and modifications may be devised by those skilled in the art. For example, features recited in the various dependent claims could be combined with each other in any suitable combination(s). In addition, features from different embodiments described above could be selectively combined into a new embodiment. Accordingly, this description is intended to embrace all such alternatives, modifications and variances which fall within the scope of the appended claims.

The following acronyms and abbreviations that may be found in the specification and/or the drawing figures are defined as follows (the abbreviations and acronyms may be appended with each other or with other characters using e.g. a dash or hyphen):

3DoF three degrees of freedom
3DoF+ 3DoF with additional limited translational movement along the X, Y, and Z axes
6-DOF or 6DOF six degrees of freedom
AR augmented reality
ASIC application-specific integrated circuit
AVP audio video profile
BVH biovision hierarchy
ECEF earth-centered, earth-fixed coordinate system
FPGA field-programmable gate array
GPS global positioning system
H263/H265 video compression standards of the H26x family
HMD head mounted display
HTTP hypertext transfer protocol
id identifier
I/F interface
IK inverse kinematic
I/O input/output
lat latitude
lon longitude
MPEG moving picture experts group
MR mixed reality
N/W network
RCNN region-based convolutional neural network
RNN recurrent neural network
RTCP real-time transport control protocol
RTP real time transport protocol
SDP session description protocol
SIP session initiation protocol
SON self-organizing/optimizing network
V3C visual volumetric video-based coding
VR virtual reality
XR extended reality
UE user equipment (e.g., a wireless, typically mobile device)
URI uniform resource identifier
WebRTC web real-time communication

What is claimed is:

1. An apparatus comprising:
at least one processor; and
at least one non-transitory memory storing instructions that, when executed by the at least one processor, cause the apparatus at least to:
transmit, from a client device to a server, an estimate of pose data, the pose data indicating at least one of a position, translation, or orientation of the client device relative to a coordinate system, wherein the client device comprises the apparatus;
determine, with the client device, a confidence score that indicates a probability of the estimate of the pose data to be correct; and
transmit, from the client device to the server, the confidence score that indicates the probability of the estimate of the pose data to be correct;
wherein the confidence score is configured to be used with the server to determine a re-estimate of the pose data, in response to the estimate of the pose data transmitted from the client device to the server being inadequate based on the confidence score.

2. The apparatus of claim 1, wherein the instructions, when executed by the at least one processor, cause the apparatus at least to:
signal, to the server, a threshold for assistance when the confidence score or a validity value is low; and
receive assistance from the server when the confidence score or the validity value is lower than the threshold, the assistance comprising a correction of the estimate of the pose data.

3. The apparatus of claim 1, wherein the instructions, when executed by the at least one processor, cause the apparatus at least to:
receive from the server another confidence score that indicates a confidence of the re-estimate of the pose data.

4. The apparatus of claim 3, wherein the confidence score is determined based on at least one of: a neural network trained on motion capture recordings of a plurality of users, or a type of the apparatus.

5. The apparatus of claim 1, wherein the instructions, when executed by the at least one processor, cause the apparatus at least to:
signal at least one parameter that defines a validity of the pose data; and
signal a current state of the validity of the pose data;
wherein the at least one parameter that defines the validity of the pose data is signaled within a payload as part of a real time transport protocol delivery session, and the current state of the validity of the pose data is signaled within the payload as part of the real time transport protocol delivery session.

6. The apparatus of claim 1, wherein the instructions, when executed by the at least one processor, cause the apparatus at least to:
determine a plurality of regions for rendering at the client device dependent on a viewport of a user of the client device, based on the confidence score;
wherein the plurality of regions comprises a first region to be delivered at a first quality, a second region to be delivered at a second quality, and a third region at least partially around the first region to be delivered at a third quality;
wherein the first quality is higher than the second quality, and the third quality is equivalent to or lower than the first quality and higher than the second quality.

7. The apparatus of claim 5, wherein the at least one parameter that defines the validity of the pose data is based on at least one of: biometric data, a device operation metric, environmental data, or a dependency on a device different from the apparatus.

8. The apparatus of claim 1, wherein the instructions, when executed by the at least one processor, cause the apparatus at least to:
stop transmission of the pose data, in response to the confidence score falling below a value, the confidence score indicating a confidence of the pose data.

9. The apparatus of claim 1, wherein the instructions, when executed by the at least one processor, cause the apparatus at least to:
receive a heartbeat signal from the server to determine whether the pose data is still valid; and
transmit, to the server, a response to the heartbeat signal to indicate the validity of the pose data.

10. An apparatus comprising:
at least one processor; and
at least one non-transitory memory storing instructions that, when executed by the at least one processor, cause the apparatus at least to:
receive, with the apparatus from a client device, an estimate of pose data, the pose data indicating at least one of a position, translation, or orientation of the client device relative to a coordinate system, wherein a server comprises the apparatus; stream from a client device, the pose;
receive, with the server from the client device, a confidence score that indicates a probability of the estimate of the pose data received from the client device to be correct;
determine, based on the confidence score received from the client device, whether the estimate of the pose data received from the client device is inadequate; and
determine a re-estimate of the pose data, in response to determining that the estimate of the pose data received from the client device is inadequate.

11. The apparatus of claim 10, wherein the instructions, when executed by the at least one processor, cause the apparatus at least to:
receive, from the client device, signaling of a threshold for assistance when the confidence score or a validity value is low; and
transmit assistance to the client device when the confidence score or the validity value is lower than the threshold, the assistance comprising a correction of the estimate of the pose data.

12. The apparatus of claim 10, wherein the instructions, when executed by the at least one processor, cause the apparatus at least to:
determine another confidence score that indicates a confidence of the re-estimate of the pose data, and transmit the another confidence score to the client device or to another client device, or
receive from the another client device another confidence score that indicates a probability of an estimate of pose data received from the another client device.

13. The apparatus of claim 12, wherein the confidence score is based on at least one of: a neural network trained on motion capture recordings of a plurality of users, or a type of the client device.

14. The apparatus of claim 10, wherein the instructions, when executed by the at least one processor, cause the apparatus at least to:

receive signaling of at least one parameter that defines a validity of the pose data; and receive signaling of a current state of the validity of the pose data;

wherein the at least one parameter that defines the validity of the pose data is signaled within a payload as part of a real time transport protocol delivery session, and the current state of the validity of the pose data is signaled within the payload as part of the real time transport protocol delivery session.

15. The apparatus of claim 10, wherein the instructions, when executed by the at least one processor, cause the apparatus at least to:

determine, with the server, a plurality of regions for rendering at the client device dependent on a viewport of a user of the client device, based on the confidence score;

wherein the plurality of regions comprises a first region to be delivered at a first quality, a second region to be delivered at a second quality, and a third region at least partially around the first region to be delivered at a third quality;

wherein the first quality is higher than the second quality, and the third quality is equivalent to or lower than the first quality and higher than the second quality.

16. The apparatus of claim 14, wherein the at least one parameter that defines the validity of the pose data is based on at least one of: biometric data, a device operation metric, environmental data, or a dependency on a device different from the client device.

17. The apparatus of claim 10, wherein receipt of the pose data is stopped, in response to Rati the confidence score falling below a value, the confidence score indicating a confidence of the pose data.

18. The apparatus of claim 10, wherein the instructions, when executed by the at least one processor, cause the apparatus at least to:

transmit a heartbeat signal to the client device to determine whether the pose data is still valid; and receive from the client device a response to the heartbeat signal to indicate the validity of the pose data.

19. The apparatus of claim 10, wherein the server comprises a split rendering server.

20. A method comprising:

receiving, with an apparatus from a client device, an estimate of pose data, the pose data indicating at least one of a position, translation, or orientation of the client device relative to a coordinate system, wherein a server comprises the apparatus;

receiving, with the server from the client device, a confidence score that indicates a probability of the estimate of the pose data received from the client device to be correct;

determining, with the apparatus based on the confidence score received from the client device, whether the estimate of the pose data received from the client device is inadequate; and determining, with the apparatus, a re-estimation of the pose data, in response to determining that the estimate of the pose data received from the client device is inadequate.

* * * * *